United States Patent [19]

Mayer

[11] Patent Number: 5,025,689
[45] Date of Patent: Jun. 25, 1991

[54] METHOD AND APPARATUS FOR MACHINING AXIALLY SYMMETRICAL PARTS

[75] Inventor: Theo Mayer, Boll, Fed. Rep. of Germany

[73] Assignee: Boehringer Werkzeugmaschinen GmbH, Goppingen, Fed. Rep. of Germany

[21] Appl. No.: 327,063

[22] Filed: Mar. 22, 1989

[30] Foreign Application Priority Data

Mar. 22, 1988 [DE] Fed. Rep. of Germany ....... 3809619

[51] Int. Cl.⁵ .............................................. B23B 5/18
[52] U.S. Cl. ........................................ 82/106; 82/142; 82/148; 82/150; 82/1.11
[58] Field of Search ................. 82/106, 107, 1.11, 117, 82/142, 148, 150

[56] References Cited

U.S. PATENT DOCUMENTS 1,780,390 11/1930 Hopkins .
3,793,687 2/1974 Berbalk ................................ 82/106

Primary Examiner—Frederick R. Schmidt
Assistant Examiner—Lawrence Cruz
Attorney, Agent, or Firm—Marks Murase & White

[57] ABSTRACT

The invention pertains to a process and an apparatus for machining axially symmetrical parts on lathes or rotary broaching machines in which the workpiece is held at each end by an axial clamping pin and a clamping jaw assembly, the clamping pins and clamping jaw assemblies cooperating such that the clamping jaw assemblies may be retracted relative the clamping pins when the ends of the workpiece are being machined and may be extended relative the clamping pins when additional support for the workpiece is desired, as, for example, when the central portion of the workpiece is being machined. The clamping pins and clamping jaw assemblies are movable relative each other and relative the workpiece such that machining of both ends of the workpiece may take place simultaneously or sequentially, followed by machining of the central portion of the workpiece, on a single apparatus and as part of a continuous, uninterrupted machining sequence.

5 Claims, 4 Drawing Sheets

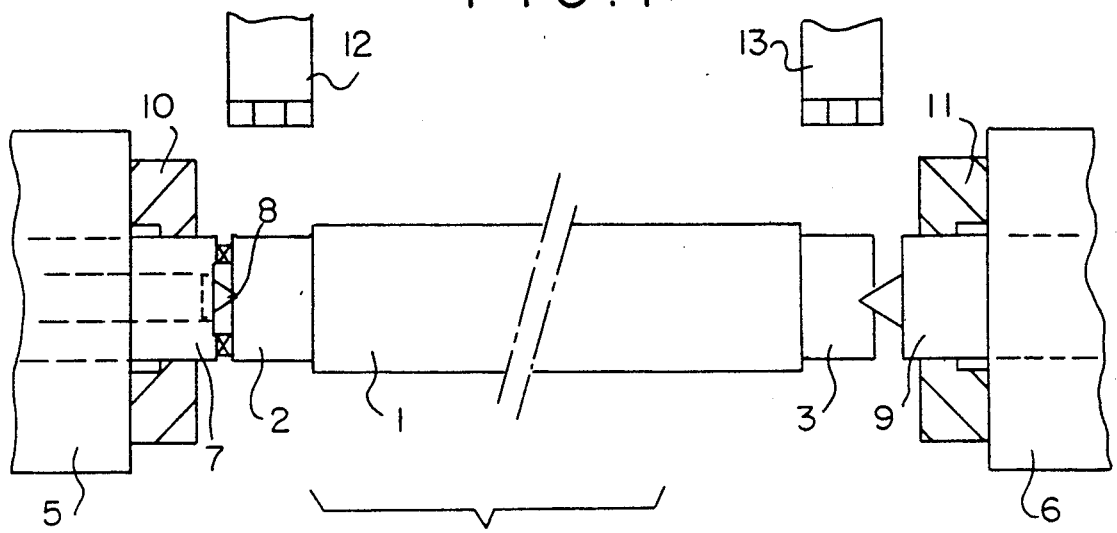
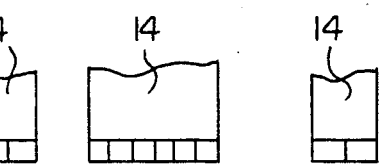
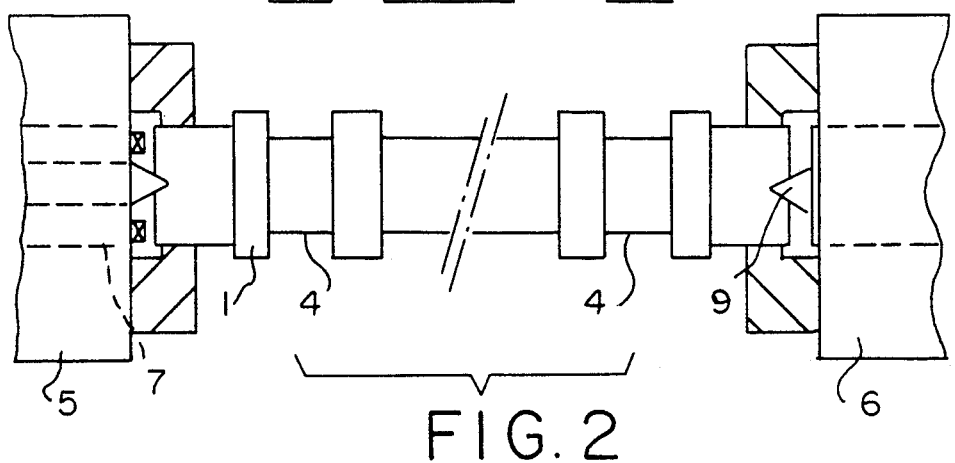

METHOD AND APPARATUS FOR MACHINING AXIALLY SYMMETRICAL PARTS

BACKGROUND OF THE INVENTION

The invention pertains to the machining of axially symmetrical parts such as transmission shafts, as well as crankshafts and camshafts.

The processing of these parts is generally accomplished in several stages and on various types of machining equipment. For example, in the case of crankshafts, the arms and pins of each main bearing typically are first rough machined by external circular milling or internal circular milling. Since the pin diameter, in particular, will not normally meet roundness, runout, and surface quality specifications after this step, it must subsequently undergo finish machining, hence turning or grinding, before being completed.

However, there are also special machining processes, especially for crankshafts, which make it possible to achieve such high precision in a single machining step that further intermediate machining processes are not required prior to heat treatment. This is often the case with so-called round broaching.

It has proven advantageous, both when machining a workpiece in several steps on several different machines and when performing finished machining in a single process, to use machine tools with two opposing main spindles, each of which is also equipped with jaw chucks which thus clamp both ends of the workpiece in the jaw chucks during machining. In contrast to a purely pointed pickup, as typically used between lathe centers, such two-ended clamping in jaw chucks has the advantage that radial deflection of workpieces, particularly those with low flexural stiffness, occurs considerably less frequently. This has a favorable effect on dimensional accuracy, especially when the central portion of the workpieces are being machined. Such a machine tool is identified as the type K 10 crankshaft lathe disclosed by Boehringer Brothers, in its 1955 brochure No. 2000555.

However, the clamping of both ends of the workpiece in jaw chucks has a disadvantage in that machining of the peripheral surface in the end regions of the workpiece held in the jaw chucks, and possibly the machining of the adjacent arm and/or flange facings, must be completed on other machines and with a different method of mounting before the actual machining of the piece itself.

Such rough machining of the pins in the end regions is done, for example, on combination centering lathes, with the workpieces rotating, in order to machine the pin diameter. Inasmuch as the crankshafts are centered by counterbalancing, yet another machine is required to machine the peripheral surfaces and arm surfaces in the end regions of the crankshaft. As a rule, even these different types of mounts, and the clamping and unclamping of the workpiece they require, are enough to result in compromised dimensional accuracy in the finished machined piece. In particular, the trueness of the peripheral surfaces with reference to the lathe centers leaves something to be desired, because no better solution is possible even with a stationary workpiece and a rotating tool.

A further disadvantage consists in the large amounts of unproductive time taken up with machining using differing processes and in various mounts, with transporting the workpieces back and forth among the individual machines, and with intermediate storage of the workpieces in buffer storage areas between machining steps, after which they must be re-mounted and aligned. Obviously, to mount them, the main drives of the machine in question must be brought to a stop, which not only leads to additional unproductive time but also wastes energy and increases wear on the drive in question.

Aside from this, having several machines and any necessary linkages between them requires much higher investments in space and machinery than does a single machine tool that allows the complete machinery of such a workpiece.

OBJECT AND SUMMARY OF THE PRESENT INVENTION

The object of the present invention is therefore to enable the machining of the aforesaid workpeices while avoiding the disadvantages presented.

This object is attained by enabling the described axially symmetrical diameter of workpieces, for example of crankshafts, to be machined completely by turning or rotary broaching in a single sequence and on a single machine. First the peripheral surfaces and radial surfaces in the end regions of the workpiece are machined, at which time clamping of the ends is accomplished exclusively by means of a lathe center. Once both end regions of the crankshaft are finished, clamping of the peripheral surfaces at the ends can be accomplished by means of radial action clamping assemblies, which then provides sufficiently stable clamping of the workpiece for the machining of the central portion. Clamping between the centers is maintained in addition to the clamping provided by the radial action clamping assemblies, so that loosening of one or both of the radial action clamping assemblies will not result in a change of position of the workpiece or misalignment as would be the case if the workpiece were completely released and reclamped.

The provision of complete machining on a single machine with a single mounting lowers the space costs and space requirements for this single machine, and saves the investment costs for machines that can perform the machining of the crankshaft end pins.

The greatest advantage, however, might result from the saving of unproductive down time, since each process on an additional machine involves not only transportation and storage costs but also time for adjustments, alignment, workpiece changes, and the like. Reducing these types of unproductive down time on the one hand lowers the workpiece machining time, which results in reduced need for liquid assets or inventory and, on the other hand, makes it possible to meet extremely short delivery deadlines, perhaps for the first time.

In accordance with the present invention, the machining of the end regions and of the central portion of the axially symmetrical workpiece can be accomplished in various ways, depending on the options available on the lathe or rotary broaching machine and the boundary conditions placed on stability and shaping of both the raw and finished workpiece.

If, for example, the workpiece can be axially loaded by compression forces from a dog, the peripheral and radial surfaces can even be machined simultaneously while the workpiece is clamped between two lathe centers and rotated by at least one dog. In this case, each of the lathe centers, or, in their place, the dog at the center of which the lathe center is located, is in turn clamped in one radial action clamping means.

However, subsequent machining requires that the lathe centers be axially movable with respect to the radial action clamping means in which they are located, and that the lathe center located at the center of the dog also be axially movable with respect to this dog. The simplest configuration of such axially movable lathe centers would then be one in which the lathe centers could be fixed in their two extreme positions, that is, fully extended and fully retracted. In the fully extended position, in which the workpiece is clamped between centers for machining of the end regions, the lathe centers receive additional radial support from the grips of the radial action clamping means. In the fully retracted position, on the other hand, the lathe centers withdraw axially behind the forward surface of the grips of the radial action clamping means, so that the peripheral surfaces in the end regions of the workpiece can additionally be clamped by the grips of the radial action clamping means while being clamped by lathe centers in such a way that the lathe centers remain in their retracted positions.

Once the first stage of machining is completed, namely the machining of the end regions of the workpiece, with the workpiece clamped between lathe centers that remain in their fully extended position, the lathe centers pull back into their retracted position. Since the workpiece is nevertheless still intended to remain held between the lathe centers, at least one of the chucks must move in toward the workpiece at an appropriate rate of speed and to the same extent as the two lathe centers withdraw to their retracted position in order to preserve the position of the two lathe centers relative to the workpiece and to maintain the clamping of the workpiece. This can in fact take place while the main drive, and hence the spindles, continue to run, although as a general rule the jaws must be opened outward to prevent collision with the workpiece, the end regions of which are in this manner moving into the two clamping chucks. The clamping chuck can be made capable of moving toward the workpiece both by making the clamping chuck movable with respect to its associated main spindle and also by making the entire main spindle or the respective head stock movable.

The best known of the aforementioned radial action clamping means would probably be the jaw chuck, especially the three-jaw chuck, in which the radially movable jaws serve as the grips that engage the piece to be machined.

However, collet chucks could be employed equally well for the purpose described here, and these have the advantage of having less mass than a conventional three-jaw chuck and additionally, depending on their design, permit the achievement of greater trueness when machining axially symmetrical parts. However, a further relevant advantage of such collet chucks, especially for the present invention, consists in that it is easier to achieve axial movement of such collet chucks than of a jaw chuck or of the jaws of a jaw chuck.

Specific use of the terms "jaws" or "jaw chucks" below is solely for the purpose of simplifying the description and is intended to refer generally to all appropriate forms of radial clamping assemblies;

As soon as both end regions of the workpiece are located in the end regions of the jaws of the two jaw chucks, then, the workpiece can then be clamped between the jaws of the jaw chucks in addition to being clamped between the lathe centers, which additional clamping then provides sufficiently stable clamping to permit subsequent machining of the central portion of the workpiece, which is where the greatest bending forces will naturally occur.

Should the workpiece be unable to bear the axial loading from a dog, as is often the case, e.g., with crankshafts, another machining procedure must be used. This type of machining also requires a lathe or rotary broaching machine with two opposing main spindles, each of which bears one jaw chuck, with axially movable lathe centers located in the center of each jaw chuck, with at least one of the jaw chucks capable of altering its axial position.

Just as with the first machining process, the workpiece is held between the lathe centers throughout the entire machining. However, the end regions are not machined simultaneously, but sequentially, which has the advantage that the piece need not be related by a dog, which always applies large axial forces to the workpiece. Rather, the end of the workpiece not currently being machined is clamped by the jaw chuck in addition to being held by the lathe centers, and the workpiece is related by this jaw chuck, which obviously requires that the lathe center at this end of the workpiece be in its retracted position. It is further necessary that the jaws of this jaw chuck be movable independent of each other, since they will normally have to clamp an unmachined and therefore out-of-round surface on the workpiece. In contrast, the opposite end of the workpiece is held by th lathe center alone, which lathe center is in its extended position so as to permit unimpeded machining of the peripheral and radial surfaces in this end region of the workpiece almost to the lathe center.

As soon as the machining of the first end region is completed, the two lathe centers change position, i.e., they move synchronously from extended to retracted positions and vice versa, which shifts the workpiece axially, the positions of the two clamping chucks remaining unchanged. For this to happen, it is obviously necessary that the jaws in both clamping chucks first be drawn radially outward to prevent collisions. The lathe center at the end of the workpiece that is already machined is now in retracted position, so that the peripheral surface at this end can be clamped additionally by the jaws of the jaw chuck. In contrast, the opposite end of the workpiece is now held exclusively by the lathe center, so that this end region of the workpiece is now available for machining.

Before the central portion of the workpiece subsequently undergoes machining, the lathe center at the workpiece end last machined withdraws into its retracted position with respect to the jaw chuck to permit the jaws of the jaw chuck to grasp the peripheral surface of the second end region of the workpiece. Since the position of the lathe center relative to the workpiece must remain unchanged, however, so as to permit the workpiece to remain clamped between the lathe centers, the jaw chuck must move in toward the workpiece to the same extent as the lathe center withdraws relative to the jaw chuck. Obviously all of the operations mentioned here can also be accomplished with the main spindles running.

However, should the only available machine tool with two opposing main spindles and jaw chucks be one in which the position of at least one of the jaw chucks cannot be changed axially, or in which the axial change in the position of one of the jaw chucks cannot be accomplished synchronously with the change in position of the opposing jaw chuck, the approach of the clamping chuck, described as necessary in the last step of the above described machining process, can be circumvented by having the jaws in the jaw chuck extend far enough axially that they not only clamp this lathe center when the lathe center is extended but clamp the workpiece even when the lathe center is only halfway retracted. In this manner, the workpiece can be left in an intermediate position for machining of its central portion, i.e., both lathe centers remain in an intermediate position between fully extended and fully retracted, and both end regions of the workpiece are clamped and swung by the jaws in this intermediate position.

The types of machining presented are explained in greater detail below with reference to the accompanying exemplary drawing.

BRIEF DESCRIPTION OF THE DRAWING

FIGS. 1 and 2 are diagrammatic side elevational views of portions of a first embodiment of machining apparatus in accordance with the present invention in first and second operating positions, respectively, illustrating the method performed by such apparatus.

DETAILED DESCRIPTION OF THE PRESENT INVENTION

Figure 9:
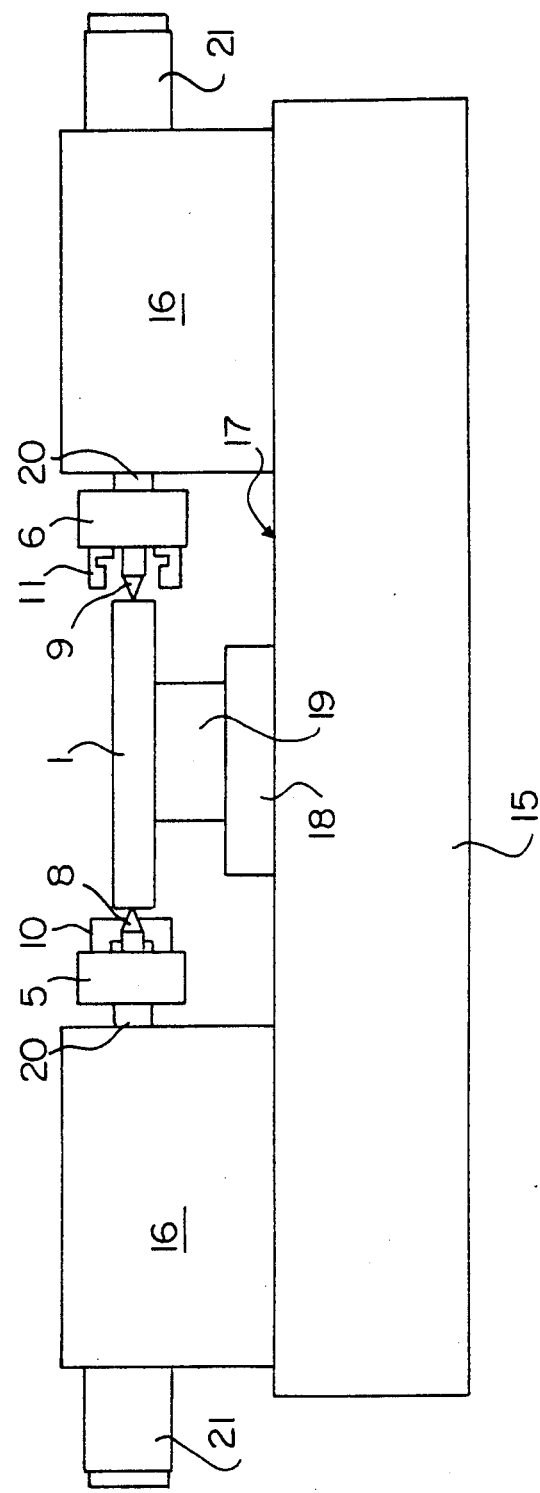
FIG. 9 is a diagrammatic side elevational view of an overall machining apparatus for use in accordance with the present invention.

The machining processes and apparatus described in connection with the present invention are based on the use of a lathe or rotary broaching machine with two opposing main spindles, each of which is equipped with a jaw chuck, in the center of each of which jaw chuck is disposed an axially movable lathe center. A schematic showing an example of such a lathe is presented in FIG. 9. It is apparent from this drawing that two head stocks 16 are disposed on a bed 15, with each of the two main spindles 20 projecting from each of the two head stocks 16 toward the other head stock. Both main spindles 20 are equipped with jaw chucks 5, 6, in the center of each of which are located axially movable lathe centers 8, 9, each of which can also be clamped by jaws 10, 11 of jaw chucks 5, 6 as required. Main spindles 20, jaw chucks 5, 6, and lathe centers 8, 9 on both sides are aligned and can be driven synchronously, for example via appropriate control of the separate main drive motors 21 present for each head stock. Obviously, both of the main spindles 20 can also be driven by a common main drive motor 21. In the present case, a workpiece 1 is clamped between the two lathe centers 8, 9, said workpiece being capable of being machined by tools attached to table base 19 that is able to travel laterally on turning slide 18, which in turn is able to travel along guide 17 on bed 15 parallel to the longitudinal axis of workpiece 1.

Should either of the jaw chucks 5, 6 be capable of changing its position axially, this can be accomplished either by an axial displacement of jaw chuck 5, 6 relative to its respective main spindle 20, or by axial displacement of main spindle 20 relative to head stock 16, or by relative motion of the entire head stock 16 relative to the machine bed 15. In the last case the same guide 17 on which the turning slide 18 runs could be used for the displacement of the head stock 16 on bed 15.

Should an axially symmetrical workpiece be machined on such a machine tool according to the procedure in FIGS. 1 and 2, one of the two jaw chucks would additionally have to be equipped with a dog 7 as shown in FIGS. 1 and 2. This dog 7 is axially movable relative to jaw chuck 5, just as lathe center 8 must be embodied so as to be axially movable relative to dog 7. In contrast, the opposing jaw chuck 6 contains only a lathe center 9 that in turn must be axially movable within jaw chuck 6.

To machine end regions 2, 3 of workpiece 1 with tools 12, 13, workpiece 1 is held between lathe centers 8, 9. Rotation is effected by dog 7, shown in FIG. 1 within jaw chuck 5. Lathe centers 8, 9, which can be fixed in a fully extended position and in a fully retracted position and which can move freely between the two, are in this case in a fully extended position. Nevertheless, in order to prevent radial deflection caused by the machining forces on the workpiece, lathe center 9 is radially supported by jaw 11 of jaw chuck 6, on the one end, while dog 7, and thus indirectly lathe center 8 as well, is radially supported by jaw 10 of jaw chuck 5. However, such a method of rotation is possible only with workpieces that are able to bear axial forces from dog 7 without buckling.

Since workpiece 1 is now clamped, unimpeded machining of the peripheral surfaces and of some of the radial surfaces in the end regions of workpiece 1 is now possible.

In addition to being clamped between lathe centers 8, 9, the now machined peripheral surfaces at end regions 2, 3 or workpiece 1 can now be clamped by means of jaws 10, 11 for subsequent machining of the central portion 4 of workpiece 1, where the strongest radial loads on the workpiece naturally occur, said additional clamping leading to significantly lessened deflection during the subsequent machining than if the workpiece were clamped only between lathe centers 8, 9. However, in order for jaws 10, 11 to be able to grasp workpiece 1, it is necessary that lathe centers 8, 9 be located in their retracted positions. However, since lathe centers 8, 9 are to continue holding the workpiece, it is necessary that the position of the two lathe centers 8, 9 relative to workpiece 1 remain unchanged despite the retraction of the two lathe centers 8, 9 relative to jaw chucks 5, 6. This is effected by an axial change in the position of at least one of the two jaw chucks 5, 6 in toward workpiece 1 by an amount corresponding to the sum of the distances travelled by the two lathe centers 8, 9 as they retract relative to their respective jaw chucks 5, 6. Not only must the axial change in position executed by this jaw chuck, 5 or 6, correlate with the positional change of the two lathe centers 8, 9, but it must also take place synchronously with the execution of the latter positional change so that workpiece 1 is held continually while these lathe centers are retracting relative to jaw chucks 5, 6. Obviously, for this to happen, not only must dog 7 be additionally retracted from the workpiece, but jaws 10, 11 of jaw chucks 5, 6, which had previously clamped dog 7 or lathe center 9, as the case may be, must also be drawn outward to permit workpiece 1 to be introduced into the gripping range of jaws 10 or 11, as the case may be, without collision.

Figure 3:
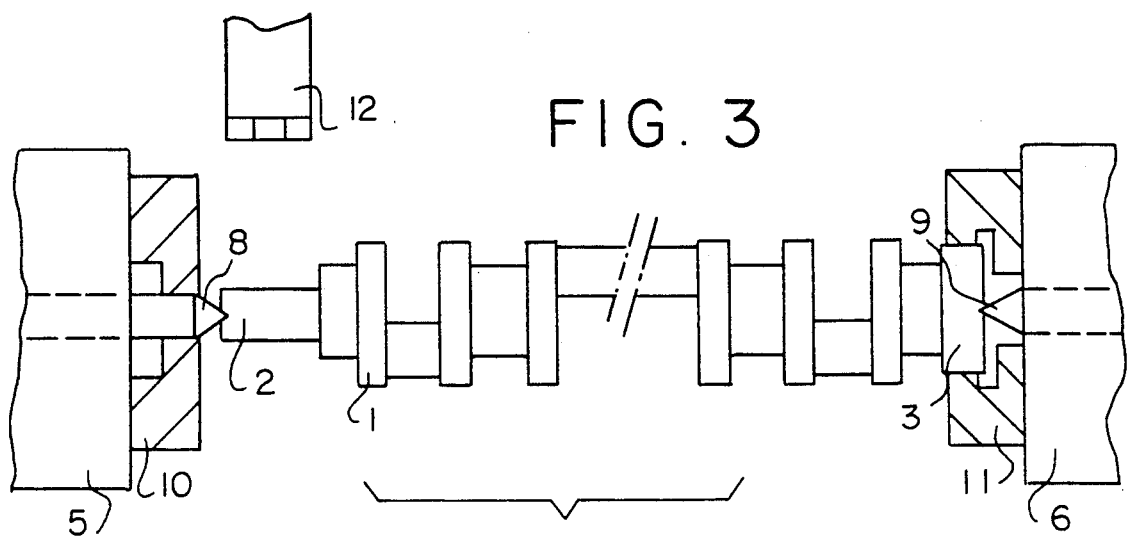
FIGS. 3, 4 and 5 are diagrammatic side elevational views of portions of a second embodiment of machining apparatus in accordance with the present invention in first, second and third operating positions, respectively, illustrating the method performed by such apparatus.
Figure 4:
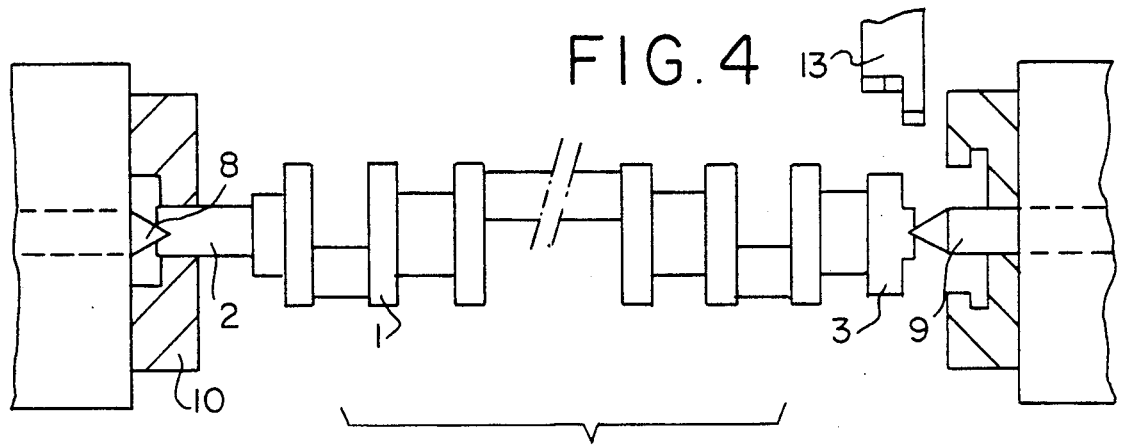
Figure 5:
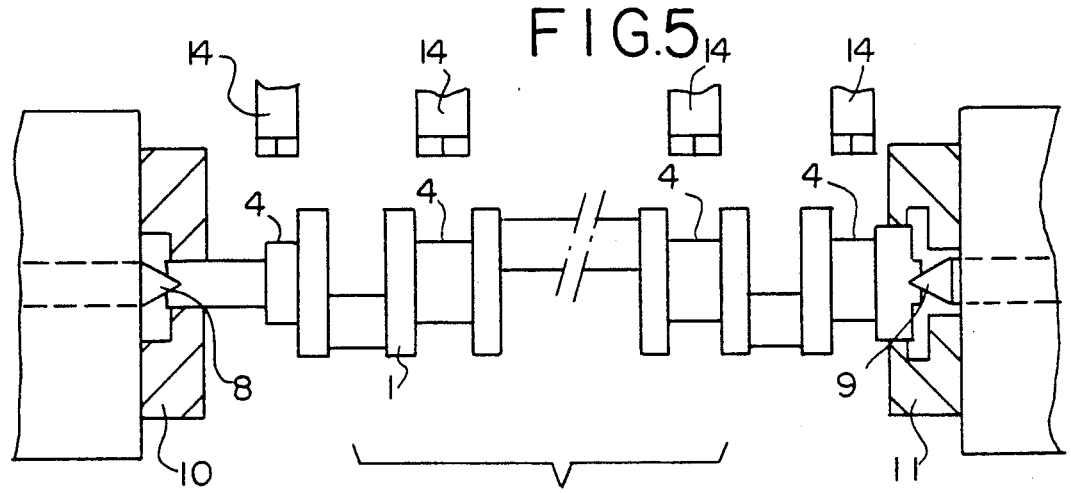

In contrast, FIGS. 3 through 5 show the machining of a workpiece that is not stable enough to bear axial loads from a dog without buckling. In the case of such a workpiece 1, therefore, the two end regions 2, 3 are not machined simultaneously, but sequentially, as shown in FIGS. 3 and 4. FIG. 3 shows the machining of the left end region 2 of workpiece 1 by a corresponding tool 12, wherein this left end region 2, as in the machining of right end region 3 in FIG. 1, is held exlusively by lathe center 8. In contrast, in addition to being held by lathe center 9, the right end region of workpiece 1 is additionally clamped by the jaws 11 of the right jaw chuck 6 and is also swung by them, which allows the omission of a dog. Since the other end region 3 is, naturally, not machined in the machining of the first end region 2 shown in FIG. 3, it is highly recommended that the jaws 11 of the right jaw chuck 6, which must grasp an unmachined periperal surface on the right end region 3 or workpiece 1, be capable of being moved radially independently of each other in order to compensate for irregularities in the roundness of the unmachined peripheral surface.

As soon as the left end region of workpiece 1 is thus processed, the jaws 10, 11 of jaw chucks 5, 6, which jaws have clamped the left lathe center 8 or the right end region 3 or workpiece 1, respectively, are drawn radially outward in order to enable workpiece 1 to execute an axial change of position, specifically into the grasping range of the jaws 10 of the left clamping chuck 5. This is accomplished by a synchronous axial movement of lathe centers 8, 9, i.e., left lathe center 8 withdraws into its retracted position in left jaw chuck 5 to the same extent that right lathe center 9 moves out of the right jaw chuck 6 into its extended position. In this manner the left, now already machined, end region 2 of workpiece 1 can now be held and swung, as in FIG. 3, not only by the left lathe center 8, but also by the jaws 10 of the left jaw chuck 5, while the other end of workpiece 1 is held only by lathe center 9, with the right end region 3 of workpiece 1 thus now available for machining. The right lathe center 9 can in this case hold workpiece 1 with lathe center 9 in extended position, or the right lathe center 9 is radially supported by clamping by means of the jaws 11 of the right jaw chuck 6.

Since both end regions 2, 3 of workpiece 1 are now machined, the peripheral surfaces of these end regions of the workpiece can now be clamped in jaw chucks 5, 6 by means of jaws 10, 11, which provide sufficiently stable clamping for subsequent machining of central portion 4 by turning or rotary broaching, as shown in FIG. 5. Left end region 2 of workpiece 1, which had already been machined, was already clamped by jaws 10 of left jaw chuck 5 while the right end region 3 was being machined, with the left lathe center 8 naturally in its retracted position relative to jaw chuck 5. Now, in order for right end region 3 also to be able to come within the gripping range of the jaws 11 of right jaw chuck 6, as shown in FIG. 5, the right lathe center 9 must also move into its retracted position relative to jaw chuck 6, while the position of the right lathe center 9 relative to workpiece 1 must remain unchanged. This is effected by an axial movement of the right jaw chuck 6 in toward the workpiece 1, synchronously with but in reverse from the retracting motion of the right lathe center 9 relative to jaw chuck 6. In this case, obviously, the jaws 11 of the right jaw chuck 6 must be drawn radially outward again in order to avoid collisions with the workpiece 1. However, the main spindles 20 that drive the jaw chucks 5, 6 continue to run without a change in speed, which is always a possibility, even with the other changes in the overall clamping of workpiece 1 that are described.

This offers the advantages, already enumerated, of reducing unproductive down time and less wear on the main motor or motors 21 that drive the main spindles 20.

Figure 6:
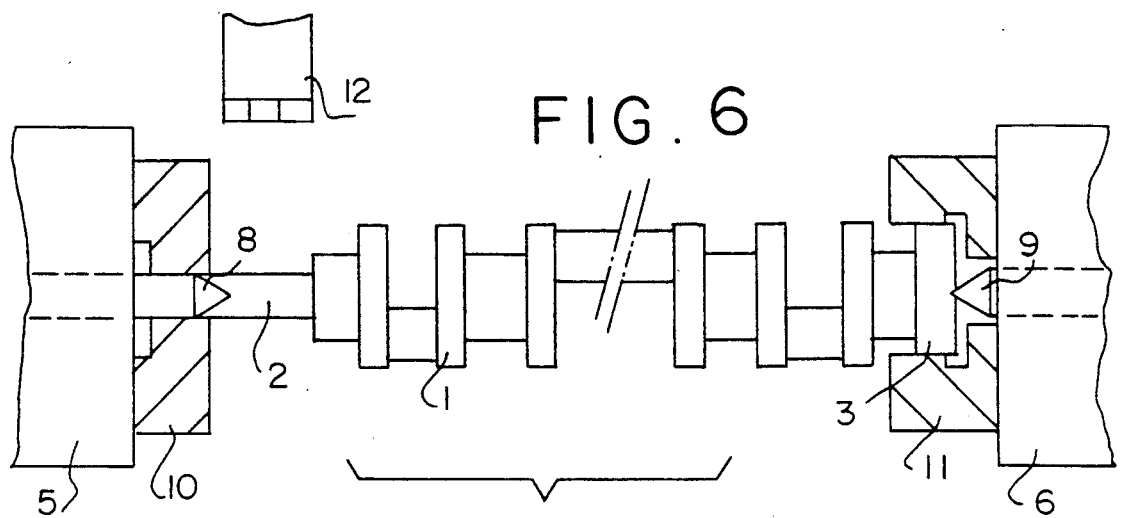
FIGS. 6, 7 and 8 are diagrammatic side elevational views of portions of a third embodiment of machining apparatus in accordance with the present invention in first, second and third operating positions, respectively, illustrating the method performed by such apparatus.
Figure 7:
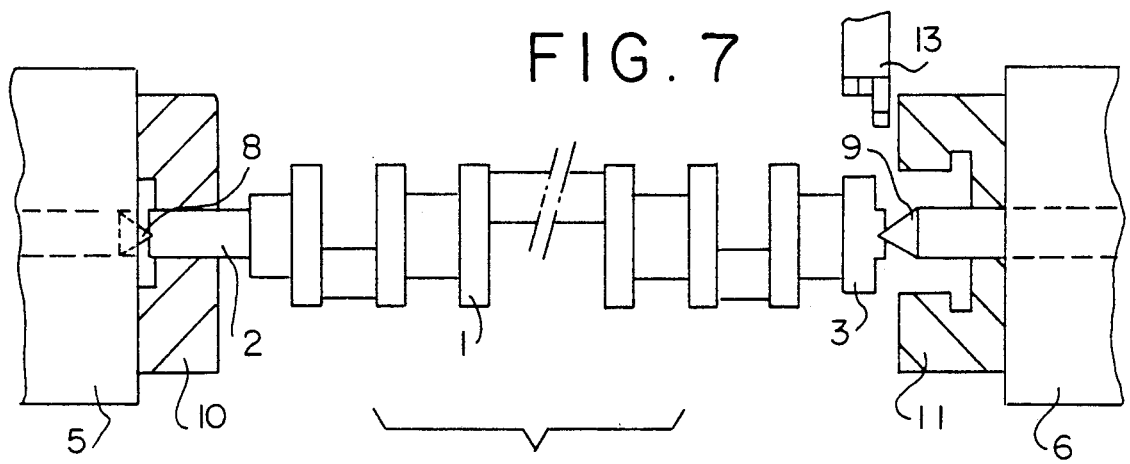
Figure 8:
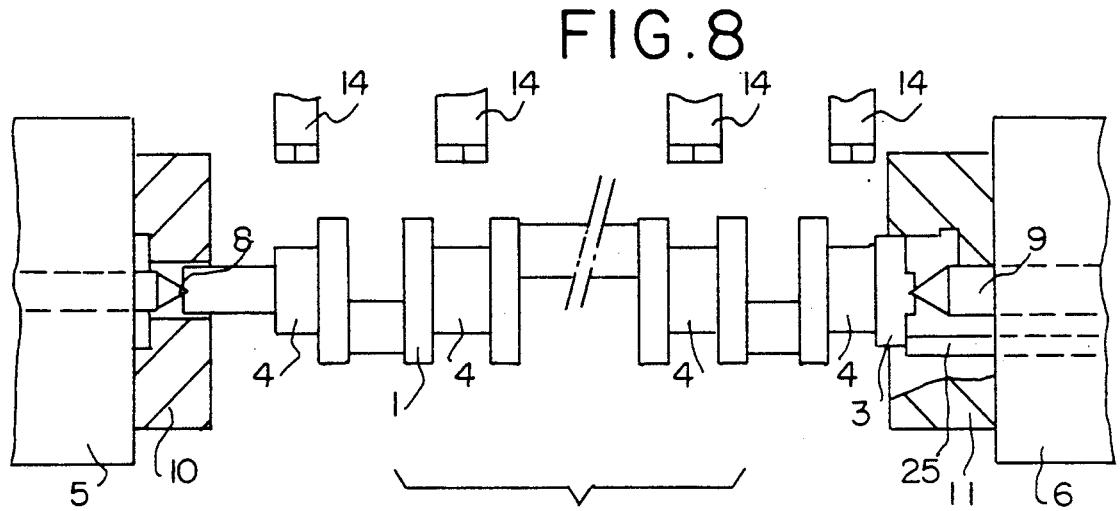

However, should the only available machine tool be one in which the position of at least one of the jaw chucks 5, 6 cannot be changed axially, or in which such an axial change in the position of one of the jaw chucks cannot be accomplished synchronously with the axial movements of lathe centers 8, 9, as required, the machining of workpiece 1 can be modified as shown in FIGS. 6 through 8.

With respect to the procedure involved, FIGS. 6 and 7 correspond exactly to FIGS. 3 and 4, but, as FIG. 8 shows in contrast to FIG. 5, during the subsequent machining of the central portion 4 of workpiece 1, the clamping of end regions 2, 3 of workpiece 1 by jaws 10, 11 of jaw chucks 5, 6 is not enabled by an axial movement of one of the jaw chucks 5, 6, but rather by different dimensions for the axial extent of jaws 10, 11. This dimenssion is selected such that when lathe centers 8, 9 are extended only said lathe centers are clamped by jaws 10, 11, while on the other hand the peripheral surfaces of end regions 2, 3 of workpiece 1 are grasped by jaws 10, 11 as soon as the lathe centers are halfway retracted, not when the lathe centers are only completely retracted. This greater axial extent of jaws 10, 11 is visible in FIGS. 6 through 8. Furthermore, FIG. 8 shows a longitudinal stop 25 that serves lathe centers 8, 9 in assuming an intermediate position between extended and retracted position is provided. This has been accomplished when workpiece 1, in the course of changing its position axially to the right between the position shown in FIG. 7 and that shown in FIG. 8, encounters a specific surface of this longitudinal stop 25. This additionally provides a definite position for workpiece 1 that can be used as a reference point for the positioning of tools and the like.

Inasmuch as the present invention is subject to many variations, modifications and changes in detail, it is intended that all matter contained in the foregoing description or shown in the accompanying drawings shall be interpreted as illustrative and not in a limiting sense.

I claim:

1. Apparatus for machining an axially symmetrical workpiece, comprising:
    first and second means each for selectively supporting a respective end of a workpiece at its axis of rotation whereby end regions of said workpiece are exposed for unobstructed machining; and
    first and second means each for selectively radially clamping a respective one of said end regions of said workpiece to assist said axial supporting means in the rotational support of the workpiece to permit accurate machining of central regions thereof;
    said axial supporting means and said radial clamping means being movable relative to each other and cooperating to permit machining of the entire workpiece on a single apparatus in a single manufacturing sequence.

2. The invention as recited in claim 1, wherein each of said first and second axial supporting means is movable axially relative a respective one of said first and second radial clamping means.

3. The invention as recited in claim 2, wherein both of said first and second axial supporting means are movable simultaneously in the same direction relative both of said first and second radial clamping means.

4. The invention as recited in claim 2, wherein both of said first and second axial supporting means are movable simultaneously relative said first radial clamping means, and wherein said second radial clamping means is movable relative said first radial clamping means and both of said axial supporting means.

5. The invention as recited in claim 2, wherein said first and second radial clamping means are axially fixed relative each other, and wherein each of said first and second axial supporting means is axially movable to a first position at which a first end of the workpiece is exposed for machining and the opposite end thereof is engaged by its adjacent radial clamping means, to a second position at which said first end of the workpiece is engaged by its adjacent radial clamping means and the opposite end of said workpiece is exposed for machining, and to a third position at which both ends of the workpiece are engaged by both of said radial clamping means to support the workpiece during machining portions of the workpiece between the ends thereof.

* * * * *